G. W. CUMMING.
Car Brake.

No. 20,468.

Patented June 1, 1858.

UNITED STATES PATENT OFFICE.

G. W. CUMMINGS, OF PHILADELPHIA, PENNSYLVANIA, ASSIGNOR TO D. K. JACKMAN AND JOS. HANNA, BOTH OF LOCK HAVEN, PENNSYLVANIA.

RAILROAD-CAR BRAKE.

Specification of Letters Patent No. 20,468, dated June 1, 1858.

*To all whom it may concern:*

Be it known that I, G. W. CUMMINGS, of Philadelphia, county of Philadelphia, in the State of Pennsylvania, have invented certain new and useful Improvements in Car-Brakes; and I do hereby declare that the following is a full and exact description thereof, reference being had to the accompanying drawings and to the letters of reference marked thereon.

The nature of my invention consists in certain improvements in "automatic car brakes" as hereinafter fully described.

To enable those skilled in the art to make and use my invention I will proceed to describe its construction and operation referring by letters, to the accompanying drawings—forming part of this specification; where—

Figure 1:
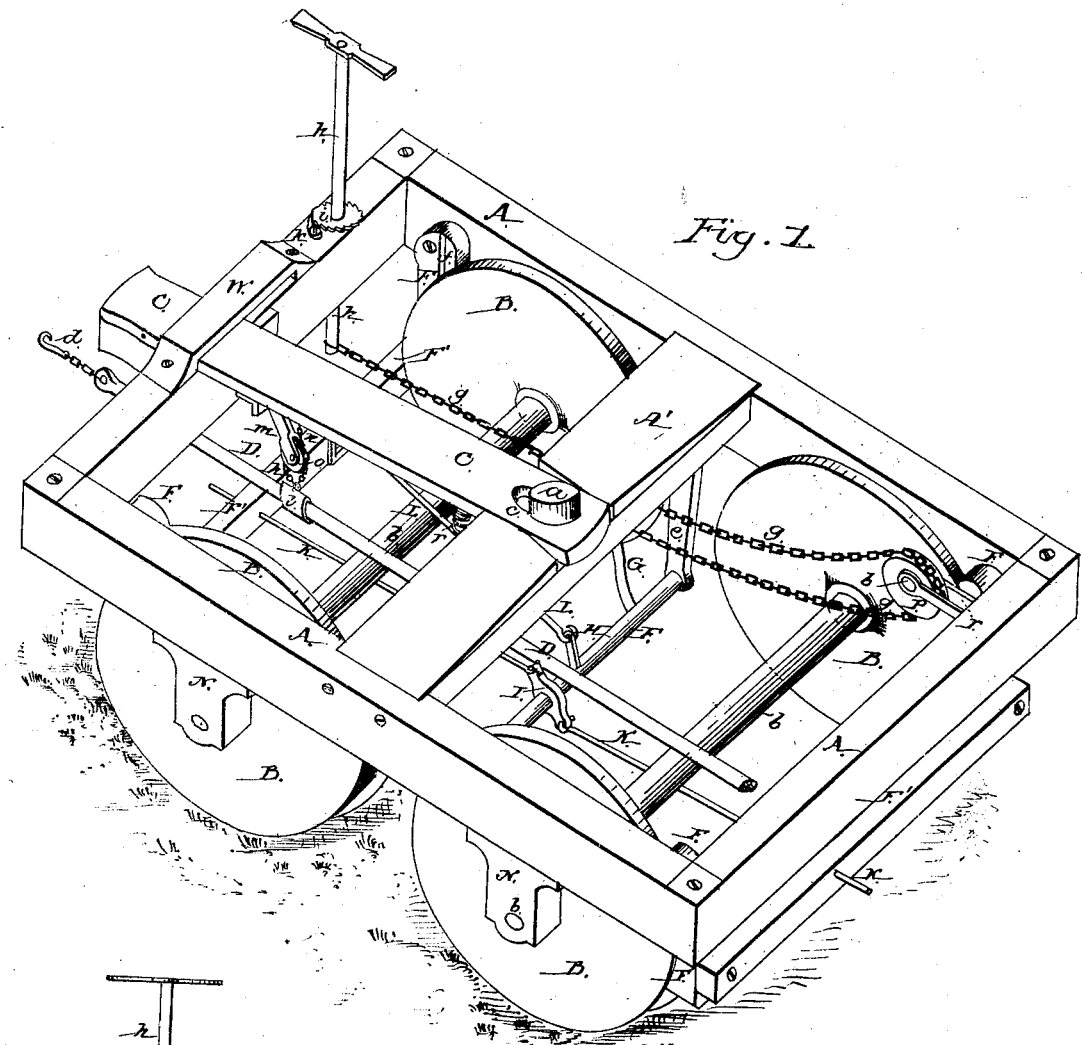
Figure 2:
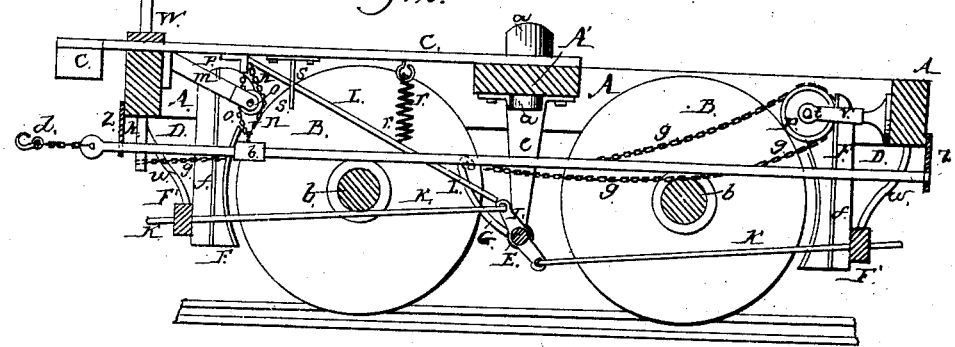

Figure 1, represents a perspective view of my improvement attached to an ordinary car truck and Fig. 2, a longitudinal vertical section of the same.

Similar letters denoting the same parts in the different views:—A, represents the frame of an ordinary car truck of which, B, are the four wheels, $b$, their axles and, N, the stands in which are suitable boxes for the axles, $b$, to run in; the whole constructed and arranged in the usual way.

F, are the brake blocks, which are pivoted at their upper ends to the frame of the truck and each pair of which are connected together at their lower ends by a suitable frame or cross beam F′, from which latter extends upward to the frame of the truck, one or more brace rods, $w$, which also serve to keep the brake blocks, when released, from the wheels.

A′, is a central cross beam of the truck frame, to the center of which is pivoted the "buffer head", or draw bar as will be presently described: and from the under side of which, project downward, near either end, two stands or arms, $e$, which carry in suitable bearings in their lower ends, a horizontal shaft, E;—upon this shaft are two single arms or cranks, G, and H, and one double crank, I;—to each extremity of the crank, I, is attached a rod K, connected at its opposite end to the brake frame F′, (as shown), and to the crank, G, is fastened one end of a chain, $g$; which passes around a pulley, P, whose stud, $t$, runs in a suitable stand, $v$, secured to the end of the truck frame—and has its opposite end attached to the windlass shaft, $h$, in the forward end of the truck, upon which shaft is a suitable ratchet wheel, $i$, retained by a pawl, $k$, in the usual way, and the upper end of which is furnished with an ordinary "hand wheel." To the crank H, is looped one end of a rod, L, which is retained laterally by a guide, $s$, in which latter, it can move freely, up and down; said rod, L, is made to have an ascending tendency at its movable end by means of a spiral spring, $r$, the lower end of which is secured to said rod, near the middle of its length, and the upper end to the under side of the puller bar, C, to which latter is also secured the guide stand, $s$, and a "dog" or "stop", $p$, against which the end of rod, L, pushes, (as will be directly described). The draw head, or buffer, C, is pivoted on the top of the central beam, A′, by a pin, $a$, passing through a longitudinal slot, $c$, in the end of the draw head, C, (see Fig. 1) near its rear extremity; while the forward end of said bar, C, is kept down on the top of the frame A, by a strap, W, between which and said frame the forward end of said draw head is allowed a desirable degree of lateral play;—the slot, C, is made of a width about equal to the diameter of the pin, $a$, while its length, is such as to allow six or eight inches end play, to the bar, C;—the forward ends of each adjacent pair of buffers, or draw heads, may be connected by any desirable "coupling" arrangement.

D, is a rod extending about the length of the car, or from the aft end of the hind truck to the fore end of the forward truck, lying between the axles $b$, and the truck frame, A, near the center laterally of the latter, and passing through holes in pendant straps or bars, $z$, by which it is supported (see Fig. 2,).—this rod, D, is furnished at each end with a chain and catch, $d$, or other flexible "coupling" attachment, whereby it may be readily connected with the corresponding rod of an adjacent car, for purposes to be described;—upon said rod immediately beneath the dogs or stops, $p$, are collars or affixable clasps, $l$, having attached to them a chain or other suitable material, passing around a stationary pulley, $o$, and secured at the other end to the movable end of the rod, L;—(as seen at Fig. 2);—the pulley, $o$, is carried by a stand, m, bifurcated to allow the passage of the chain and embrace the said pulley like a "block" and fastened at its rear or butt end to the end of the truck frame.

The "brake blocks", F, are constructed in the ordinary way—of the form seen—with the exception of the insertion, through their middle—or near there—longitudinally, of a strip of india rubber or other elastic substance, the object of which is to render the block F, elastic in itself to some extent and thus prevent its imparting that disagreeable vibration to the car, through the truck, which is consequent to a nonelastic, brake block; this peculiar construction, I would remark is however more particularly desirable where the brakes are operated by the rods as contemplated in my improvement, than when retained by chains (in the ordinary way), since the former constitute a rigid, retaining arrangement, while the latter do not, there being some elasticity, owing to the nature of the chain, suspended at distant points.

The operation of my improvement will be readily comprehended from the following explanation, viz:—Supposing a number of cars, having my improvement attached to each truck, as seen in the drawings, Fig. 1, and connected by a suitable coupling, at each adjacent pair of buffers, C, to be in motion—drawn by a locomotive—then will the draw head be pulled out (as seen at Fig. 1,) so that it comes in contact with the pin, a, at the rear end of the slot, c, and the movable end of the rod L, will be held up against the under side of the bar, C, by the spring, r, and out of contact, pressure, with the dog on stop, p, and the brakes exert no influence on the wheels. Now if the motion of engine or velocity of the prime mover be sensibly checked, then will the adjacent ends of each connected pair of draw heads be brought in contact with each other—by the tendency of each car to impart its inertia to the other—and a momentum expended on each which causes it to recede from its extended position, or be forced backward, when the stop p comes in contact with the movable end of the rod L, and forces it backward, which latter, being connected to the crank H, on shaft, E, causes said shaft to oscillate in its bearings, in such direction as will cause its "double crank", I, to pull on the rods, K, and bring the brakes F, in contact with the wheels with a degree of pressure proportional to the momentum expended upon buffer or the pressure of one car against the other and as this is always greatest when the train is most suddenly checked the brakes will be most effective when it is desirable to stop suddenly; the wheels are relieved of pressure or friction as soon as the engine begins to go faster than the cars are moving (when the brakes are on), since the braking attachment does not lock itself in any position, but only keeps the brake blocks in contact with the wheels, so long as pressure is exerted upon the buffers.

It is obvious that as each truck is operated upon independently, as described, the brakes will be operated with equal facility no matter to which end of the train the engine may be attached, while it is readily perceived that some way must be provided for preventing the dogs p, from pushing against the bar l, when it is desired to "back." This object I accomplish by means of the rod D, arranged with the chains, n, pulleys, o, &c., as before described;—when it is desired to back the train, the rod, D, is pulled longitudinally in its bearings (in either direction) when one side or the other of the chain, n, is pulled around the pulley, o, and the end of the rod, L, brought down so that the dog or stop, p, slips over it and the bar, c, may move backward without affecting the said rod, L;—when the engine moves forward again the dog p, rides over the inclined rod, L, which is immediately brought up behind said dog, by the vertical, spiral spring, r, by the arrangement of the rods, D, with the chain, n, pulley, o, and rod L, and connecting the rod D, of each car with that of the others; it is obvious that the said rods may be operated upon at any point, and pulled in either direction, to throw the rod L, out of catch with the dog p.

It will be perceived that the arrangement of the shaft, E, arm or crank, G, crank I, rods K, chain, g, and windlass attachment, h, i, k, constitute the common, hand braking mechanism and that to apply my automatic braking arrangement to cars with such (common) mechanism it is only necessary to put the dog, p, in the buffer, attach the rod, L, and crank H, and the apparatus for unslipping the said rod rod, L;—all of which can be done at a very slight expense. I consider it advantageous to use my improvement in connection with the hand brake and have so arranged the parts that they can be used without interfering with the hand brake or it with them, though the elasticity of the brake blocks is most necessary when the automatic arrangement operates them. Still it is not at all detrimental to the brakes when operated by the chain arrangement.

The advantages which seem to be embraced in my improved brake are:—its effectiveness, being operated by the contact of the cars, its simplicity and consequent trifling expense;—its capacity of ready application to trucks having hand brakes, and its perfect operation where the hand brakes are used without interfering with them;— the easy manner in which it is entirely thrown out of gear; and the neutralizing of the bad effects of a rigid mechanism, by the elasticity of the blocks.

Having fully described the construction and operation of my improved automatic car brake, what I claim therein as new and useful and desire to secure by Letters Patent is:—

1. The combination of the draw head, C, dog, p, pushing rod L, crank, H, shaft, E, crank, I, rods, K, and blocks F, when the several parts are arranged to operate as and for the purpose specified.

2. The mechanism for throwing the pushing lever, L, out of gear, consisting essentially of the rod, D, chain, n, and stationary pulley, o, the whole arranged and operating as set forth.

In testimony whereof I have hereunto set my hand this twenty-third day of April 1858.

G. W. CUMMINGS.

Witnesses:
   CHAS. F. HELFFRICHT,
   JOHN CRAWFORD.